(12) United States Patent
Watanabe et al.

(10) Patent No.: US 7,936,820 B2
(45) Date of Patent: May 3, 2011

(54) MOVING-PICTURE COMPRESSION ENCODING METHOD, APPARATUS AND PROGRAM

(75) Inventors: Kazuteru Watanabe, Tokyo (JP);
Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1532 days.

(21) Appl. No.: 11/312,592

(22) Filed: Dec. 21, 2005

(65) Prior Publication Data

US 2006/0133505 A1    Jun. 22, 2006

(30) Foreign Application Priority Data

Dec. 22, 2004    (JP) .................................. 2004-371113

(51) Int. Cl.
*H04N 7/12* (2006.01)
*H04N 11/02* (2006.01)

(52) U.S. Cl. ......... 375/240.16; 375/240.12; 375/240.15; 375/240.24; 375/240.08; 375/240.21; 375/240.29; 375/240.1; 375/240.01; 382/232; 382/236; 382/238; 382/251; 382/107; 382/103

(58) Field of Classification Search ........................ None
See application file for complete search history.

(56) References Cited

U.S. PATENT DOCUMENTS

| | | | | |
|---|---|---|---|---|
| 6,064,435 | A * | 5/2000 | Iwamura .................. | 375/240.16 |
| 6,125,143 | A * | 9/2000 | Suzuki et al. ............ | 375/240.11 |
| 6,266,158 | B1 * | 7/2001 | Hata et al. ..................... | 382/232 |
| 7,266,149 | B2 * | 9/2007 | Holcomb et al. ........ | 375/240.12 |
| 2004/0233990 | A1 * | 11/2004 | Sekiguchi et al. ....... | 375/240.16 |
| 2004/0240554 | A1 * | 12/2004 | Murakami et al. ....... | 375/240.16 |
| 2005/0100092 | A1 * | 5/2005 | Sekiguchi et al. ....... | 375/240.12 |
| 2005/0135484 | A1 | 6/2005 | Lee et al. | |
| 2006/0193385 | A1 * | 8/2006 | Yin et al. ................. | 375/240.12 |

FOREIGN PATENT DOCUMENTS

| | | |
|---|---|---|
| JP | 7288814 | 10/1995 |
| JP | 884337 | 3/1996 |
| JP | 8186823 | 7/1996 |
| JP | 8205140 | 8/1996 |
| JP | 2608909 | 2/1997 |
| JP | 2003189312 | 7/2003 |
| JP | 200448552 | 2/2004 |

OTHER PUBLICATIONS

Changsung Kim, Hsuan-Huei Shih, C.-C. Jay Kuo, Fast H.264 Intra-Prediction Mode Selection Using Joint Spatial and Transform Domain Features, Apr. 25, 2004 Preprint, Elsevier Science, pp. 1-20.*

(Continued)

*Primary Examiner* — Mark K Zimmerman
*Assistant Examiner* — Miya J Cato
(74) *Attorney, Agent, or Firm* — Sughrue Mion, PLLC

(57) ABSTRACT

Disclosed are a moving-picture compression encoding apparatus comprising a motion-compensated predicting unit that includes a first cost calculator for generating cost values based upon difference information indicative of differences between prediction signals generated by a prediction signal generator and a moving-picture signal input to the moving-picture compression encoding apparatus; a preliminary selector for preliminarily selecting a plurality of blocks based upon the cost values and outputting the blocks to a second cost calculator; the second cost calculator for generating new cost values by applying a frequency conversion to the difference information regarding the block sizes that have been output from the preliminary selector; and a block size selector for selecting an optimum block size based upon the cost values resulting from the frequency conversion.

12 Claims, 8 Drawing Sheets

OTHER PUBLICATIONS

Takeshi Tsukuba et al., "Intra-prediction Mode Decision based on Frequency Characteristic" Media Glue Corp, pp. 1-10, Shinjuku-ku, Japan.

Wien et al., "Hybrid Video Coding using Variable Size Block Transfers", Visual Communications and Image Processing 2002, vol. 4671 pp. 1040-1051, Aachen, Germany, Abstract.

T. Shimizu, et al.: "A Two-Stage Variable Block Size Motion Search Algorithm for H.264 Encoder"; 2004 International Conference on Image Processing (ICIP); 2004 IEEE; vol. 3; pp. 1481-1484; Oct. 24, 2004.

C. Kim, et al.: "Fast H.264 Intra-Prediction Mode Selection Using Joint Spatial and Transform Domain Features"; Journal of Visual Communication and Image Representation; Jul. 1, 2005.

A. Jagmohan, et al.: "Time-Efficient Learning Theoretic Algorithms for H.264 Mode Selection"; 2004 International Conference on Image Processing (ICIP); 2004 IEEE; Oct. 24, 2004; pp. 749-752.

A. Hallapuro, et al.: "Performance Analysis of Low Bit Rate H.26L Video Encoder"; 2001 International Conference on Acoustics, Speech, and Signal Processing; 2001 IEEE; vol. 1 of 6; May 7, 2001; pp. 1129-1132.

A. Puri, et al.: "Video Coding Using the H.264/MPEG-4 AVC Compression Standard"; Signal Processing: Image Communication; vol. 19, No. 9; Oct. 2004; pp. 793-849.

International Telecommunication Union, "Advanced Coding for Generic Audiovisual Services," ITU-T, H.264, May 2003.

Joint Video Team (JVT), "Joint Model Reference Encoding Methods and Decoding Concealment Methods," ISO/IEC MPEG, Sep. 2003.

* cited by examiner

MOVING-PICTURE COMPRESSION ENCODING METHOD, APPARATUS AND PROGRAM

FIELD OF THE INVENTION

This invention relates to a technique for the compression encoding of moving pictures and, more particularly, to a moving-picture compression encoding method, apparatus and program for performing encoding upon selecting block size in a motion-compensated prediction scheme based upon evaluation values of a plurality of types.

BACKGROUND OF THE INVENTION

In H.264/MPEG-4 Part 10 (ISO/IEC 14496-10) (referred to as "H.264" below) (see Non-Patent Document 1), motion-compensated prediction schemes involve blocks of 16×16, 16×8, 8×16 and 8×8 in 16×16-block units and subblocks of 8×8, 8×4, 4×8 and 4×4 in 8×8-block units.

If an 8×8 block has been selected when motion-compensated prediction is performed in 16×16, 16×8, 8×16 and 8×8 blocks, the optimum block is selected from among the subblocks.

In contribution JVT-I1049d0.doc (Non-Patent document 2) at a meeting of the JVT (Joint Video Team) performing H.264 standardization work, the following have been proposed as an evaluation measure for selecting a block in a motion-compensated prediction apparatus: SAD (Sum of Absolute Differences), which generates a cost value of difference information indicative of a difference between a moving-picture signal that is input to a moving-picture compression encoding system and a prediction signal that is output from a prediction signal generating system; and SATD (Sum of Absolute Transformed Differences), which subjects this difference information to a Hadamard transform and generates cost values for all block sizes.

In H.264 referential software (Joint Model, referred to as "JM" below) that has been developed as part of the standardization activities by the JVT, the SAD and the SATD are employed in block selection in a motion-compensated prediction apparatus. Cost values for when a block size is selected are all found based upon the SAD. Alternatively, either SAD or SATD can be selected when a motion vector, which is the input in motion compensation, is detected in units of ½ pixels or ¼ pixels.

Motion-compensated prediction selects optimum block size based upon the cost value of each block size at the time of motion vector detection.

[Non-Patent Document 1] H.264/MPEG-4 Part 10 (ISO/IEC 14496-10) Internet<URL:http://www.itu.int/rec/recomme ndation.asp?type=item&lang=e&parent=T-REC-H.264-200305-I>

[Non-Patent Document 2] JVT-1049d0.doc Internet<ft p://standards.polycom.com/2003_09_SanDiego/>

SUMMARY OF THE DISCLOSURE

The following problems arise with the motion-compensated prediction apparatus of the prior art set forth above:

The first problem is that encoding efficiency is poor when a block is selected based solely upon SAD of an input signal and a prediction signal with regard to motion-compensated prediction.

The reason for this is as follows: Data that has been encoded by a moving-picture compression encoding apparatus has undergone a frequency conversion with regard to the difference information between the input signal and the prediction signal. Difference information alone, therefore, exhibits poor accuracy as a standard for evaluating encoding efficiency.

The second problem is that in a case where the SATD is employed in order to improve encoding efficiency, a large amount of computation is performed to select the optimum block size.

The reason for this is that since a plurality of block sizes exist in motion-compensated prediction, it is necessary that values obtained by frequency-converting the difference information be calculated with respect to all block sizes in the case where the optimum block is selected.

Accordingly, an object of the present invention is to provide a moving-picture compression encoding method, apparatus and program whereby the encoding efficiency of a motion-compensated prediction scheme can be improved.

Another object of the present invention is to provide a moving-picture compression encoding method, apparatus and program having a motion-compensated prediction scheme in which high-speed processing is possible.

The foregoing and other objects are attained by a moving-picture compression encoding apparatus in accordance with a first aspect of the present invention, which comprises: means for deciding input signals of motion-compensated prediction schemes based upon a motion vector that has been generated by a motion estimator; means for generating prediction signals by applying filter processing to the input signals; means for calculating first evaluation values based upon difference information indicative of differences between the prediction signals and a moving-picture signal that is input to the moving-picture compression encoding apparatus; means for preliminarily selecting a plurality of block sizes based upon the first evaluation values; means for calculating second evaluation values based upon difference information of the block sizes preliminarily selected; and means for selecting one block size from the plurality of preliminarily selected block sizes based upon the second evaluation values.

A moving-picture compression encoding apparatus in accordance with another aspect of the present invention, comprises: means for deciding input signals of a motion-compensated predicting apparatus based upon a motion vector that has been generated by a motion estimator in a case where a subblock smaller than a block size exists the a motion-compensated predicting apparatus; means for generating prediction signals by applying filter processing to the input signals; means for calculating first evaluation values based upon difference information indicative of differences between the prediction signals and a moving-picture signal that is input to the moving-picture compression encoding apparatus; means for preliminarily selecting a plurality of block sizes based upon the first evaluation values; means for calculating second evaluation values based upon difference information of the block sizes preliminarily selected; means for selecting one block size from the plurality of preliminarily selected block sizes based upon the second evaluation values; means for deciding input signals of a motion-compensated predicting unit based upon the motion vector that has been generated by the motion estimator, in a case where a predetermined block has been selected by the block selection; means for generating prediction signals by applying filter processing to the input signals; means for calculating first evaluation values based upon difference information indicative of differences between the prediction signals and the moving-picture signal that is input to the moving-picture compression encoding apparatus; means for preliminarily selecting a plurality of block sizes based upon the first evaluation values; means for calculating second evaluation values based upon difference information of the block sizes preliminarily selected; and means for selecting one block size from the preliminarily selected block sizes based upon the second evaluation values.

A moving-picture compression encoding method, in accordance with another aspect of the present invention, comprises the steps of:

deciding input signals of a motion-compensated predicting unit based upon a motion vector that has been generated by a motion estimator;

generating prediction signals by applying filter processing to the input signals;

calculating first evaluation values based upon difference information indicative of differences between the prediction signals and a moving-picture signal that is input to the moving-picture compression encoding apparatus;

preliminarily selecting a plurality of block sizes based upon the first evaluation values;

calculating second evaluation values based upon difference information of the block sizes preliminarily selected; and selecting one block size from the plurality of preliminarily selected block sizes based upon the second evaluation values.

A computer program, in accordance with another aspect of the present invention, causes a computer constituting a moving-picture compression encoding apparatus to execute the following processing:

processing for deciding input signals of a motion-compensated prediction unit based upon a motion vector that has been generated by a motion estimator;

processing for generating prediction signals by applying filter processing to the input signals;

processing for calculating first evaluation values based upon difference information indicative of differences between the prediction signals and a moving-picture signal that is input to the moving-picture compression encoding apparatus;

processing for preliminarily selecting a plurality of block sizes based upon the first evaluation values; processing for calculating second evaluation values based upon difference information of the block sizes preliminarily selected; and processing for selecting one block size from the plurality of preliminarily selected block sizes based upon the second evaluation values.

The meritorious effects of the present invention are summarized as follows.

The present invention is such that when a block size is selected in a motion-compensated prediction scheme, encoding efficiency can be improved in comparison with a method of selecting a block based solely upon the SAD.

In accordance with the present invention, it is unnecessary to adopt the SATD with regard to all block sizes when block size is selected in a motion-compensated prediction scheme. As a result, the amount of computation can be reduced and high-speed operation achieved.

Other features and advantages of the present invention will be apparent from the following description taken in conjunction with the accompanying drawings, in which like reference characters designate the same or similar parts throughout the figures thereof.

PREFERRED EMBODIMENTS OF THE INVENTION

Figure 1:
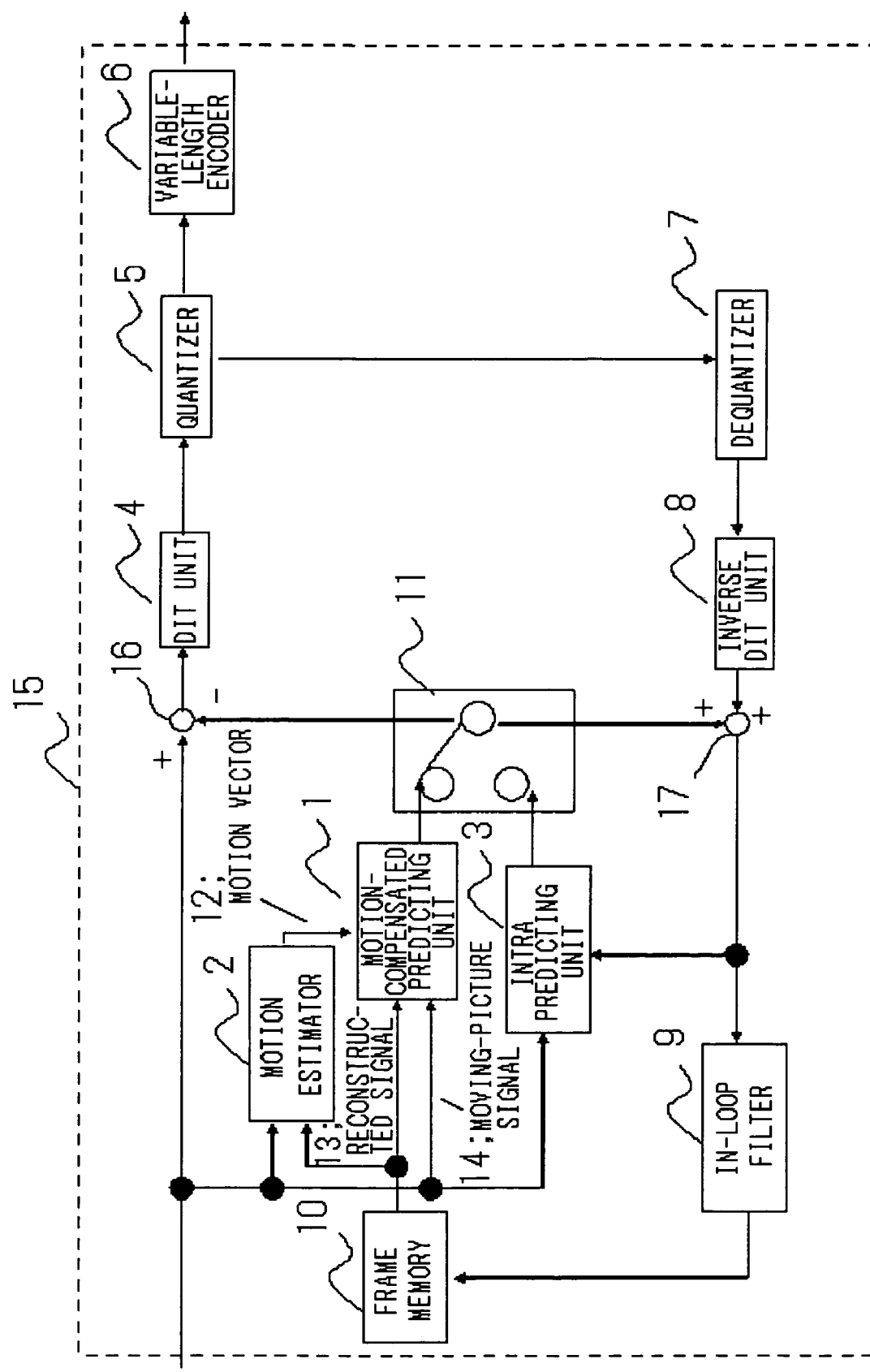
FIG. 1 is a block diagram illustrating the overall structure of the present invention.

A preferred mode of practicing the present invention will be described in detail with reference to the accompanying drawings.

The motion-compensated prediction apparatus according to the present invention performs a multiple-stage search for block size. More specifically, in a case where block size is found in two stages, the apparatus includes a preliminary selector (106 in FIG. 2) for selecting a plurality of blocks based upon cost values found by a cost calculator (105 in FIG. 2) based upon difference information indicative of differences between an input signal of a moving-picture compression encoding apparatus and prediction signals generated for each of block sizes of a plurality of types produced by motion-compensated predicting means; a cost calculator (107 in FIG. 2) for generating new cost values by frequency-converting difference information corresponding to the block sizes; and a block size selector (108 in FIG. 2) for selecting one optimum block size based upon the new cost values.

The preliminary selector (106) selects and outputs to the cost calculator (107) two or more high-order block sizes of small cost values for difference information from among all block sizes of the motion-compensated prediction scheme.

The cost calculator (107) applies a frequency conversion only to the block sizes that have been output from the preliminary selector (106) and outputs the cost values to the block size selector (108).

The block size selector (108) selects the optimum block size, based upon the cost values obtained after the frequency conversion, from among the block sizes input.

Embodiments of the present invention will now be described.

FIG. 1 is a block diagram illustrating the structure of an embodiment of the present invention.

As shown in FIG. 1, a moving-picture signal 14 is supplied to an intra predicting unit (intraframe predicting unit) 3, a motion estimator 2 and a motion-compensated predicting unit 1. The motion-compensated predicting unit 1 performs motion compensation based upon a motion vector detected by the motion estimator 2 and reconstructed information 13 in a frame memory 10. A switch 11 switches between the output of the intra predicting unit 3 and the output of the motion-compensated predicting unit 1. The result of subtracting the output of the switch 11 from the moving-picture signal 14 in a subtractor 16 is subjected to a DIT (Discrete Integer Transform) in a DIT unit 4, the signal from the DIT unit 4 is quantized by a quantizer 5 and the quantized signal is variable-length coded by a variable-length encoder 6. The output of the quantizer 5 is dequantized by a dequantizer 7 and subjected to an inverse DIT in an inverse DIT unit 8. The output of the inverse DIT unit 8 and the output of the switch 11 are added by an adder 17, the sum is supplied to the intra predicting unit 3 and to an in-loop filter 9, and the output of the in-loop filter 9 is supplied to the frame memory 10.

Figure 2:
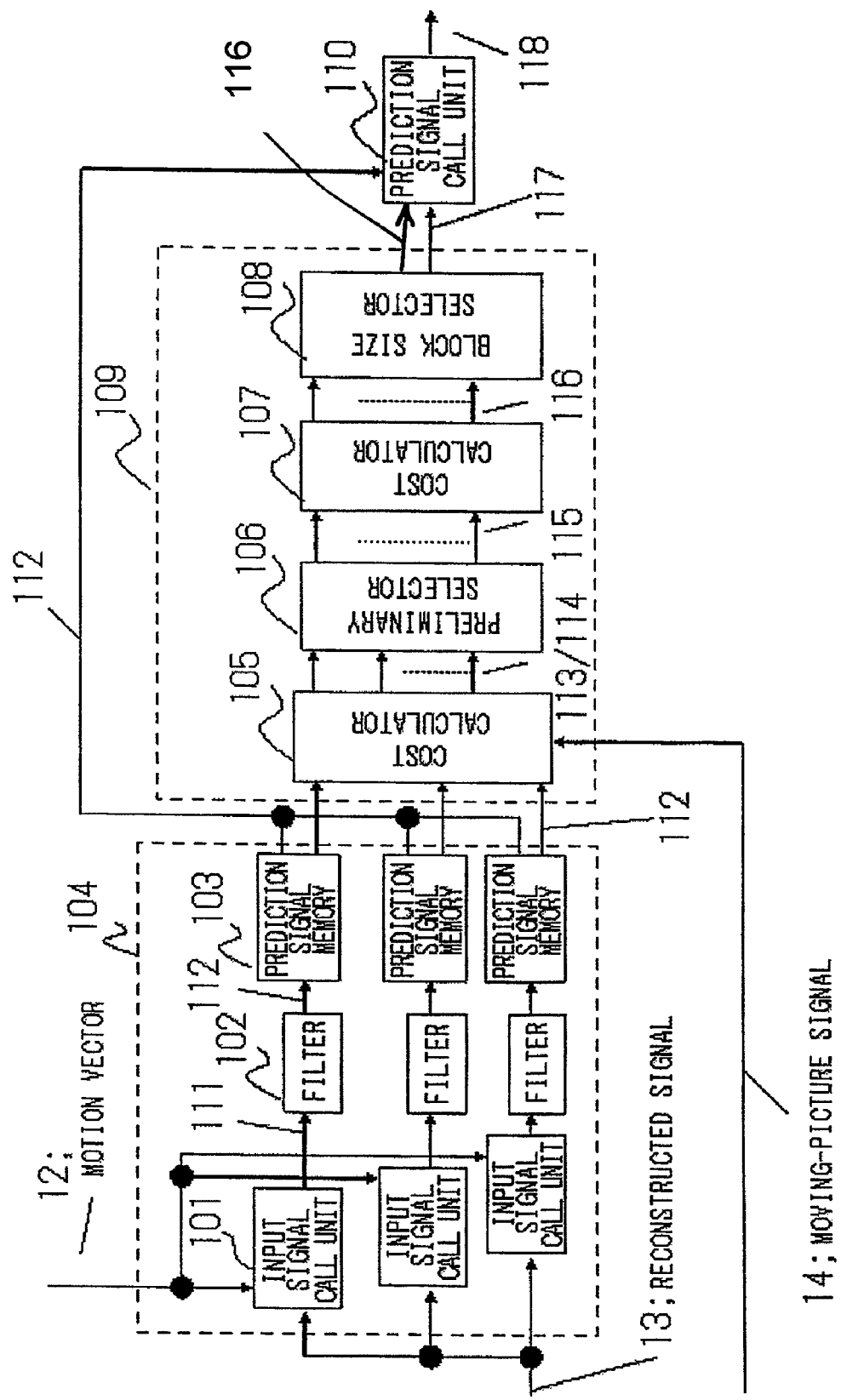
FIGS. 2, 3 and 4 are block diagrams illustrating the structures of first, second and third embodiments of the present invention, respectively.

FIG. 2 is a block diagram illustrating the details of the motion-compensated predicting unit 1 shown in FIG. 1. As shown in FIG. 2, the motion-compensated predicting unit 1 has a prediction signal generator 104, a block size decision unit 109 and a prediction signal call unit 110.

The operation of the prediction signal generator 104 will be described first. The prediction signal generator 104 includes a plurality of input signal call units 101, a plurality of filters 102 and a plurality of prediction signal memories 103. On the basis of a motion vector 12 generated by the motion estimator 2 in FIG. 1, the input signal call units 101 read in the reconstructed signals 13 of respective ones of the blocks from the frame memory 10 in FIG. 1 and deliver input signals 111 to the filters 102.

The filters 102 generate prediction signals 112 by applying filter processing to the input signals 111 from the input signal call units 101, and output the prediction signals to the prediction signal memories 103.

In motion-compensated prediction, as set forth in Non-Patent Document 1, prediction signals are generated based upon the motion vector 12 found the by the motion estimator 2 shown in FIG. 1.

In a case where locations designated by a motion vector are the positions of whole-number pixels, the input signals are used as is as the prediction signals.

If the locations designated by a motion vector are positions in units of ½ pixels, then image signals in units of ½ pixels are generated from the input signals 111 using a 6-tap filter and the prediction signals are found.

If the locations designated by a motion vector are positions in units of ¼ pixels, then image signals in units of ¼ pixels are generated from average values of the input signals 111 and image signals in units of ½ pixels and the prediction signals are found.

The prediction signal memories 103 store the prediction signals generated by the filters 102 and output these prediction signals to the cost calculator 105 and prediction signal call unit 110.

The block size decision unit 109 includes the cost calculator 105, preliminary selector 106, cost calculator 107 and block size selector 108.

The cost calculator 105 calculates difference information 113 between the prediction signals 112 and moving-picture signal 14 and outputs cost values 114 to the preliminary selector 106. The cost calculator 105 calculates the following as the difference information (block difference) 113, by way of example:

$$\text{Diff}(i,j) = \text{Original}(i,j) - \text{Prediction}(i,j) \quad (1)$$

where Prediction(i,j) is the prediction signal 112 and Original (i,j) is the moving-picture signal 14.

The cost calculator 105 outputs SAD (Sum of Absolute Differences) [see Equation (2) below)], which is the sum of absolute values of the difference data Diff(i,j), as the cost value.

$$\text{SAD} = \Sigma_{i,j} |\text{Diff}(i,j)| \quad (2)$$

The preliminary selector 106 receives the cost values 114 from the cost calculator 105, selects at least two block sizes from among block sizes for which the cost values 114 are small and outputs the selected block sizes 115 (block size candidates) to the cost calculator 107.

The cost calculator 107 calculates cost values 116 obtained by applying a frequency conversion to the difference information 113 corresponding to the block sizes 115 that have been output from the preliminary selector 106 and outputs the cost values 116 to the block size selector 108. The cost calculator 107 calculates SATD (Sum of Absolute Transformed Differences) [see Equation (3) below] as the cost value 116 of the particular block, where SATD is the sum of absolute values of DiffT(i,j) obtained by subjecting the difference data Diff(i,j) to a frequency conversion by, e.g., a Hadamard transform.

$$\text{SATD} = [\Sigma_{i,j} |\text{Diff}T(i,j)|]/2 \quad (3)$$

The block size selector 108 selects the optimum block size 117 based upon the cost values 116 that have been output by the cost calculator 107 and outputs the block size 117 and this cost value 116 as the results of motion-compensated prediction.

The moving-picture signal 14 is the input image signal of the moving-picture compression encoding apparatus, which is indicated at reference number 15.

The prediction signal call unit 110 reads in the prediction signal 112, which corresponds to the block size 117 output from the block size selector 108, from the prediction signal memory 103 and outputs this signal together with the cost value 116 and block size 117 as the result of motion-compensated prediction. Alternatively, if motion-compensated predicting unit has been selected by the switch 11 in FIG. 1, then the prediction signal call unit 110 reads in the prediction signal, which corresponds to the block size 117 output from the block size selector 108, from the prediction signal memory 103 and outputs this signal together with the cost value 116 and block size 117 as the result of motion-compensated prediction.

This embodiment has been described with regard to a two-stage search for a block. However, this can be expanded to three stages or more by the following means:

selecting a plurality of blocks by the second stage of the search and finding cost values from values obtained by quantizing DiffT(i,j) by the quantizer 5 of FIG. 1; or finding cost values from values obtained by encoding values, which are the result of quantizing DiffT(i,j) by the quantizer 5 of FIG. 1, by the variable-length encoder 6 of FIG. 1.

A second embodiment will now be described in detail with reference to FIG. 3.

Figure 3:
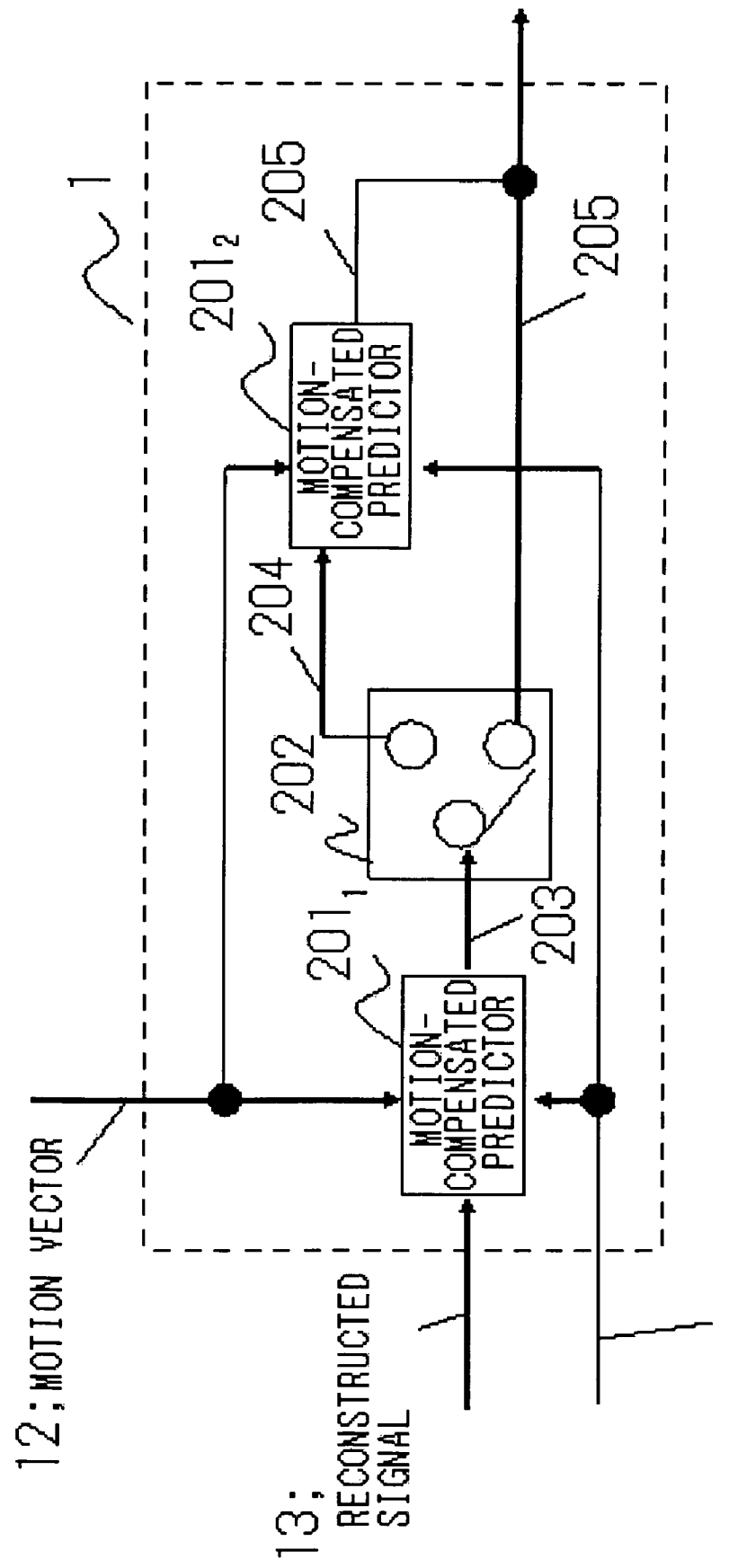

FIG. 3 is a diagram illustrating the structure of a second embodiment of the invention and depicts a section of the motion-compensated predicting unit 1 of FIG. 1 that selects block size in a case where blocks and subblocks exist. In accordance with Non-Patent Reference 1, motion-compensated prediction is performed in block sizes of 16×16, 16×8, 8×16 and 8×8.

If an 8×8 subblock has been selected as the optimum block size, then motion-compensated prediction is performed in block sizes of 8×8, 8×4, 4×8 and 4×4 and the optimum block size of the overall motion-compensated predicting unit is decided.

The structure of the overall motion-compensated predicting unit includes a motion-compensated predictor $201_1$ of the block, a motion-compensated predictor $201_2$ of the subblock and a switch 202.

The input to the switch 202 is the block size that has been selected in the motion-compensated predictor $201_1$. If the 8×8 block size has been selected, the switch 202 is switched to the motion-compensated predictor $201_2$. In other cases, the selected block size, the cost value of the selected block size and the prediction signal are output.

Each of the motion-compensated predictors $201_1$ to $201_N$ has a structure identical with that of the motion-compensated predicting unit shown in FIG. 2.

Figure 4:
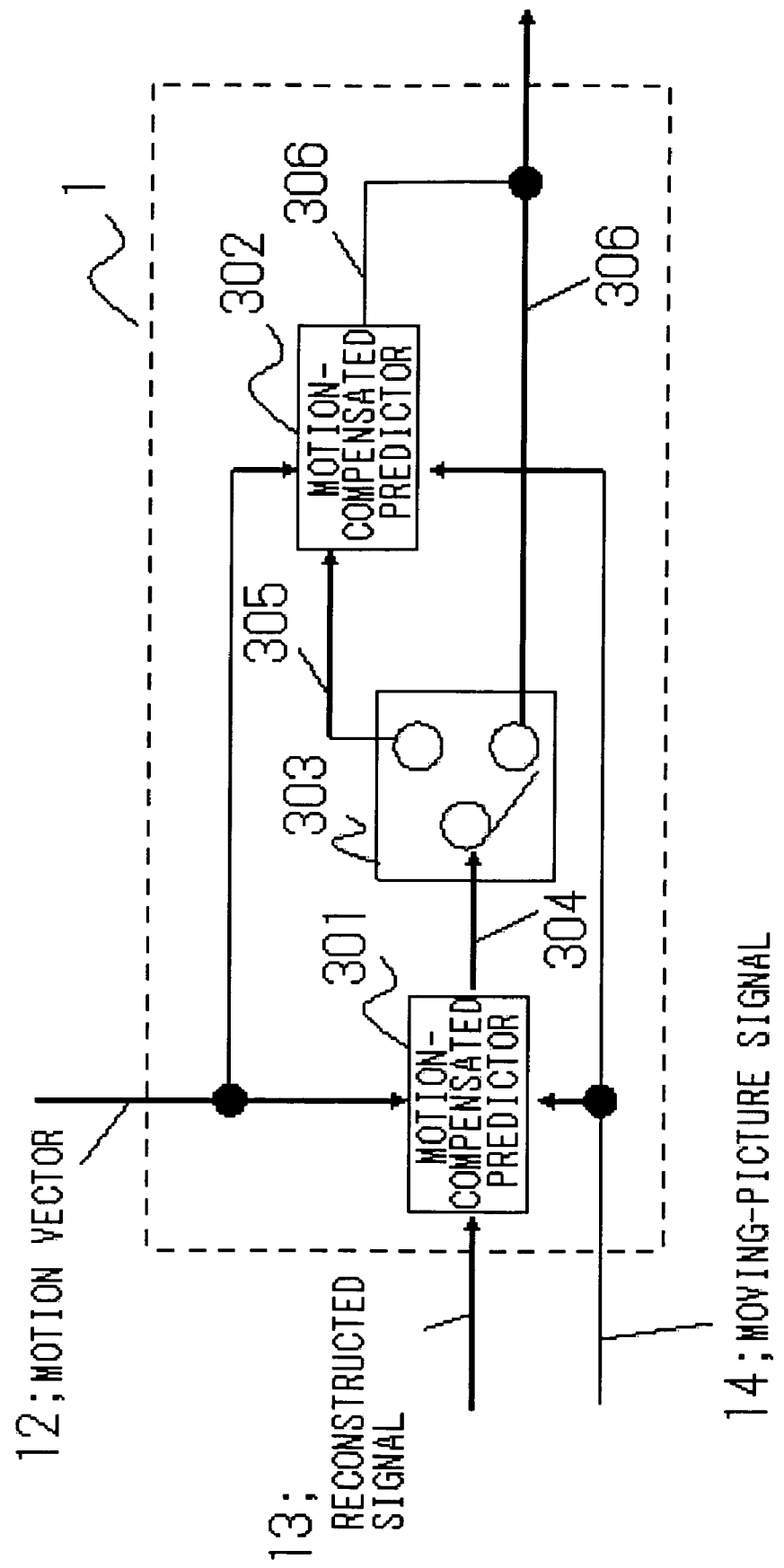

A third embodiment of the present invention will now be described in detail with reference to FIGS. 4 and 5. FIG. 4 illustrates the structure of a section of the motion-compensated predicting unit 1 that selects block size in a case where blocks and subblocks exist. The block size selector of FIG. 4 includes a motion-compensated predictor 301 of the block, a motion-compensated predictor 302 of the subblock and a switch 303.

Of the motion-compensated predictor 301 of the block and the motion-compensated predictor 302 of the subblock, one has the motion-compensated predicting unit of FIG. 2 and the other has a motion-compensated predicting unit the structure and operation of which are those of FIG. 5 or FIG. 6 described below.

Figure 5:
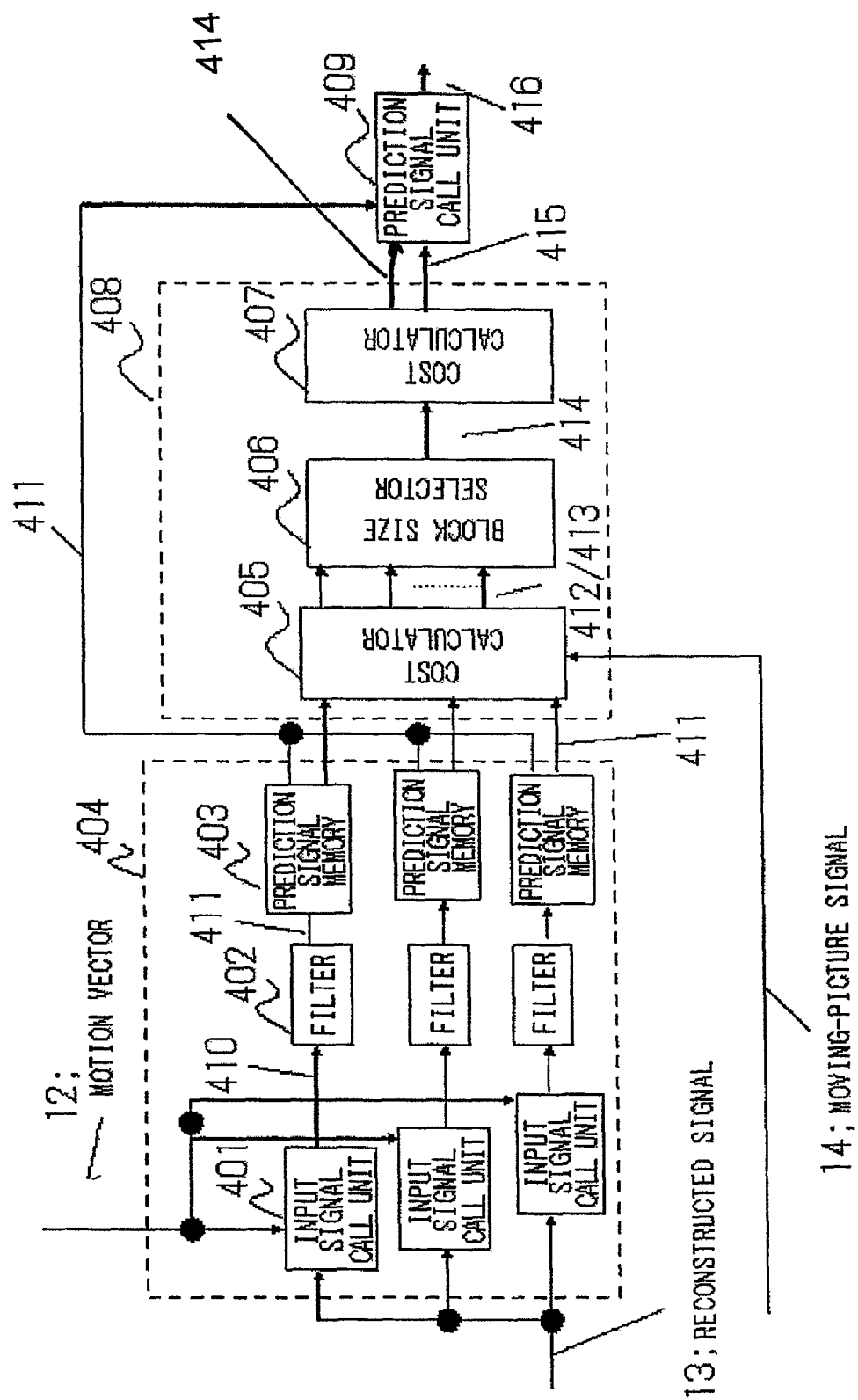
FIGS. 5 and 6 are block diagrams illustrating a portion of the third embodiment.

As shown in FIG. 5, a prediction signal generator 404 includes a plurality of input signal call units 401, a plurality of filters 402 and a plurality of prediction signal memories 403. A block size decision unit 408 includes a cost calculator 405, a block size selector 406 and a cost calculator 407.

The cost calculator 405 calculates cost values 413 [e.g., the SAD in Equation (2) cited above] from difference information 412 indicative of differences between the moving-picture signal 14, which is input to the moving-picture compression encoding apparatus 15, and prediction signals generated by the prediction signal generator 404, and outputs the cost values to the block size selector 406.

The block size selector 406 selects the optimum block size 414 from the cost values 413, which have been output from the cost calculator 405, and inputs the block size 414 and the difference information 412 thereof to the cost calculator 407.

The cost calculator 407 applies a frequency conversion [e.g., DiffT(i,j) obtained by a Hadamard transform] to the difference information 412 [e.g., Diff(i,j) of Equation (1)] of the block size 414, calculates a cost value 415 [e.g., SATD in Equation (3) cited above] and outputs the block size 414 and cost value 415 as the results of motion-compensated prediction.

Figure 6:
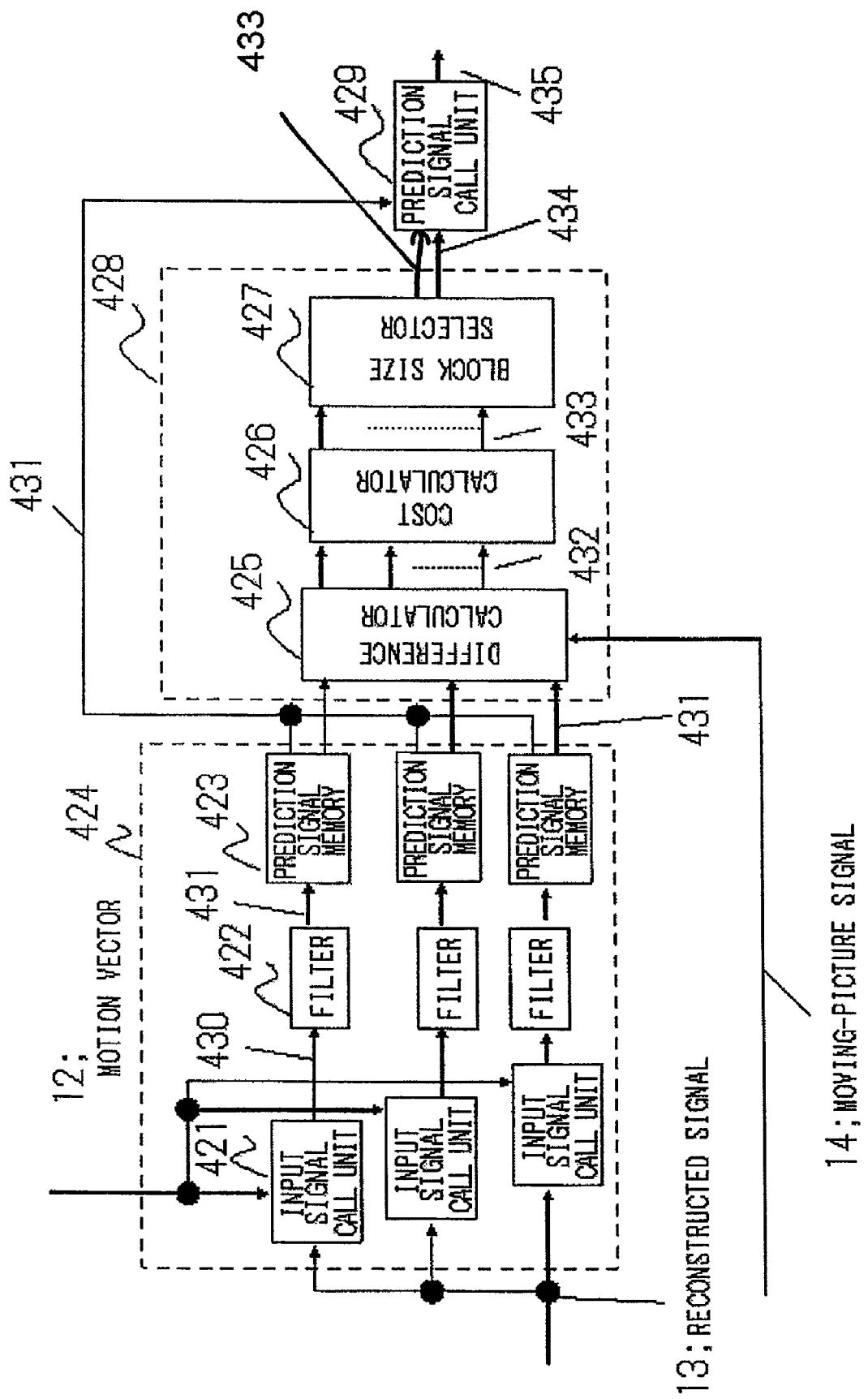

As shown in FIG. 6, a block size decision unit 428 includes a difference calculator 425, a cost calculator 426 and a block size selector 427. A prediction signal generator 424 is identical with the prediction signal generator 404 of FIG. 5.

The difference calculator 425 calculates difference information 432 [e.g., see Equation (1) cited above] indicative of differences between the moving-picture signal 14, which is input to the moving-picture compression encoding apparatus 15, and the prediction signals that are output from the prediction signal generator 424, and outputs the information to the cost calculator 426.

The cost calculator 426 applies a frequency conversion [e.g., DiffT(i,j) obtained by a Hadamard transform] to the difference information 432 [Diff(i,j)] of all block sizes, calculates cost values 433 [e.g., SATD in Equation (3) cited above] and outputs these to the block size selector 427.

The block size selector 427 selects the optimum block size 434 based upon the cost values 433 that have been output from the cost calculator 426 and outputs the optimum block size 434 and cost value 433 as the results of motion-compensated prediction. Structural components and operations other than those set forth above are identical with those of the second embodiment and need not be described again.

Figure 7:
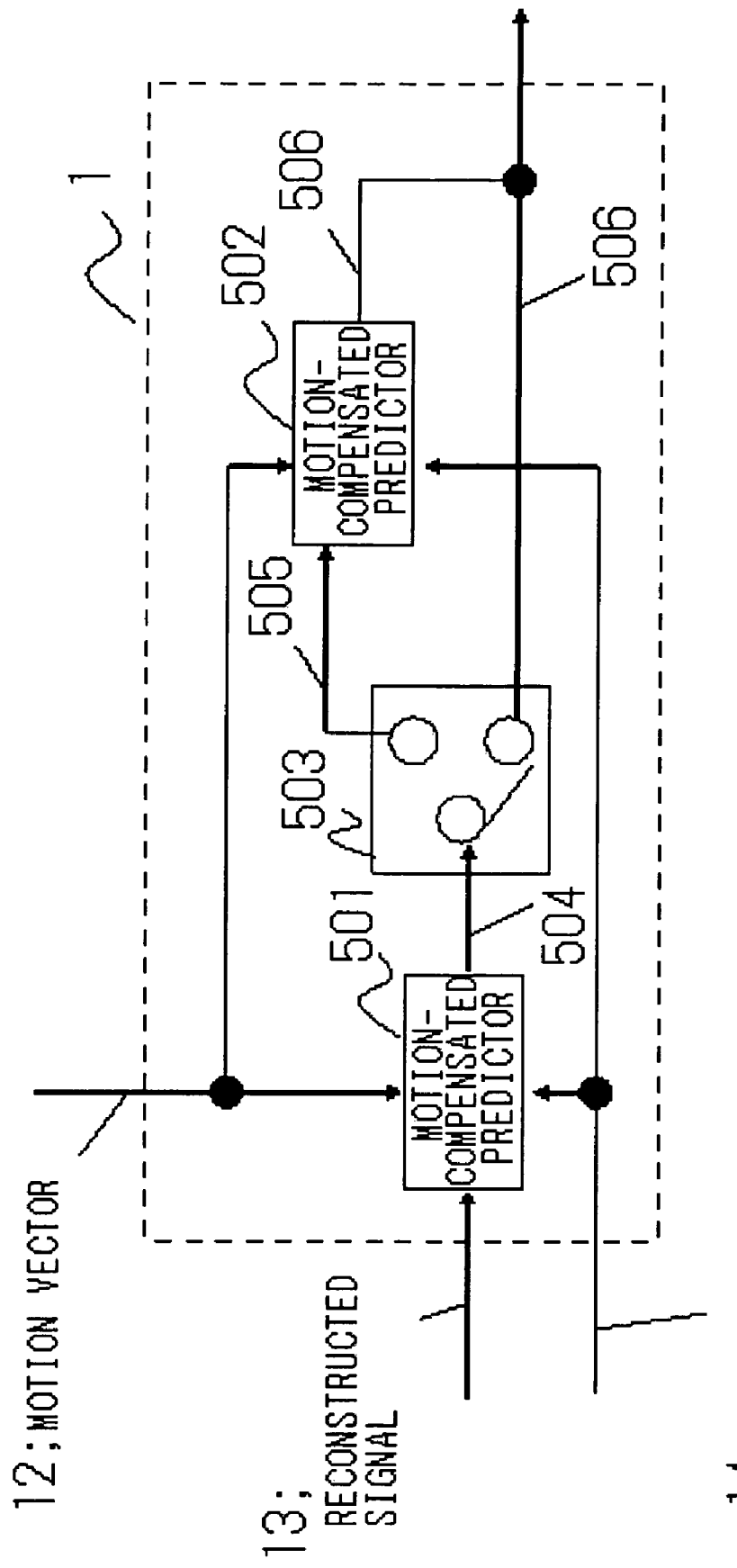
FIGS. 7 and 8 are block diagram illustrating the overall structure of a fourth embodiment of the present invention.

A fourth embodiment of the present invention will now be described with reference to FIG. 7. FIG. 7 illustrates the structure of the section for selecting block size in a case where blocks and subblocks exist in the motion-compensated predicting unit 1. This embodiment will be described with regard to a case where there are two types of numbers of block sizes selected.

The block-size selecting section includes motion-compensated predictors 501, 502 for which preliminarily selected numbers of block sizes differ for each of the block sizes, and a switch 503.

Figure 8:
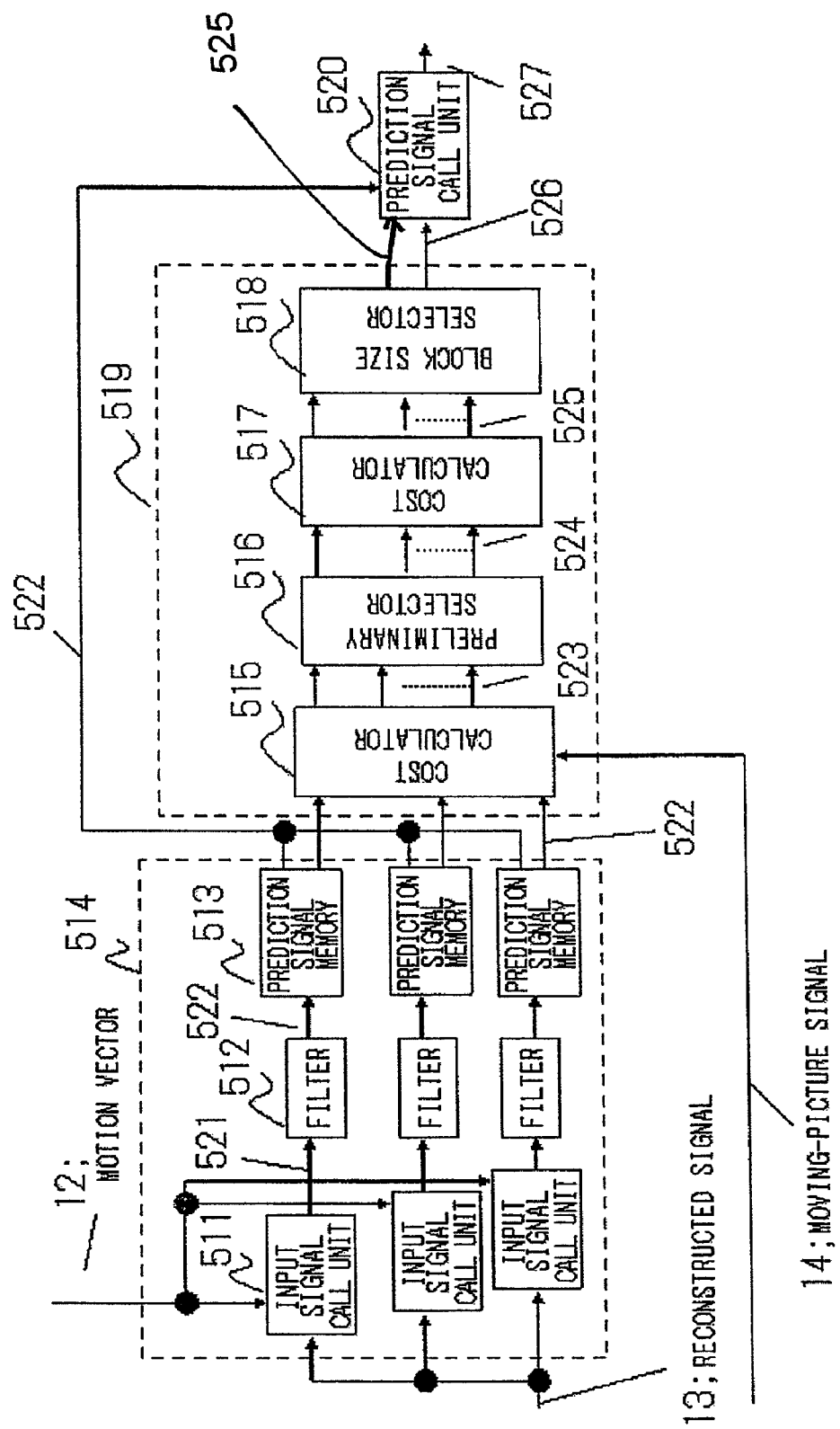

The structure of the motion-compensated predictors 501 and 502 will be described. Here the motion-compensated predictors 501 and 502 employ the motion-compensated predicting unit of FIGS. 2 and 8. FIGS. 2 and 8 differ in that the number of preliminarily selected prediction modes selected by the preliminary selector 106 differs from the number selected by a preliminary selector 516. Structural components and operations other than those set forth above are identical with those of the second embodiment and need not be described again.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications from the disclosed embodiments may be done without departing the scope of the present invention claimed as appended herewith.

Also it should be noted that any combination of the disclosed and/or claimed elements, matters and/or items may fall under the modifications aforementioned.

What is claimed is:

1. An apparatus for performing compression encoding of a moving-picture, comprising:
   means for providing input signals to the motion-compensated predicting unit based upon a motion vector generated by a motion estimator;
   means for generating prediction signals by applying filter processing to the input signals;
   means for calculating first evaluation values based upon difference information indicative of differences between the prediction signals and a moving-picture signal that is input to the apparatus for performing compression encoding;
   means for preliminarily selecting a plurality of block sizes based upon the first evaluation values;
   means for calculating second evaluation values based upon difference information of the block sizes preliminarily selected; and
   means for selecting one block size from the plurality of preliminarily selected block sizes based upon the second evaluation values.

2. The apparatus according to claim 1, wherein in case a subblock smaller than a block size exists in the motion-compensated predicting unit, the motion-compensated predicting unit comprises either a motion-compensated predicting unit of the block or a motion-compensated predicting unit of the subblock.

3. An apparatus for performing compression encoding of a moving-picture, comprising:
   a first motion-compensated predicting unit comprising:
   means for providing input signals to the first motion-compensated predicting unit based upon a motion vector generated by a motion estimator, in a case where a subblock smaller than a block size exists in the first motion-compensated predicting unit;
   means for generating first prediction signals by applying filter processing to the input signals;
   means for calculating first evaluation values based upon first difference information indicative of differences between the first prediction signals and a moving-picture signal that is input to the apparatus for performing compression encoding;
   means for preliminarily selecting a plurality of first block sizes based upon the first evaluation values;

means for calculating second evaluation values based upon difference information of the first block sizes preliminarily selected;
means for selecting one first block size from the plurality of preliminarily selected first block sizes based upon the second evaluation values;
a second motion-compensated predicting unit comprising:
means for providing the input signals to the second motion-compensated predicting unit based upon the motion vector that has been generated by the motion estimator, in a case where a predetermined block has been selected by the first means for selecting the one first block size;
means for generating second prediction signals by applying filter processing to the input signals;
means for calculating third evaluation values based upon second difference information indicative of differences between the second prediction signals and the moving-picture signal that is input to the apparatus for performing compression encoding;
means for preliminarily selecting a plurality of second block sizes based upon the third evaluation values;
means for calculating fourth evaluation values based upon the second difference information of the second block sizes preliminarily selected; and
means for selecting one second block size from the preliminarily selected second block sizes based upon the fourth evaluation values.

4. An apparatus for performing compression encoding of a moving-picture, comprising:
a first motion-compensated predicting unit comprising:
means for providing input signals to the first motion-compensated predicting unit based upon a motion vector generated by a motion estimator, in a case where a subblock smaller than a block size exists in the first motion-compensated predicting unit;
means for generating first prediction signals by applying filter processing to the input signals;
means for calculating first evaluation values based upon first difference information indicative of differences between the first prediction signals and a moving-picture signal that is input to the apparatus for performing compression encoding;
means for preliminarily selecting a plurality of first block sizes based upon the first evaluation values;
means for calculating second evaluation values based upon difference information of the first block sizes preliminarily selected;
means for selecting one first block size from the plurality of preliminarily selected first block sizes based upon the second evaluation values;
a second motion-compensated predicting unit comprising:
means for providing the input signals to the second motion-compensated predicting unit based upon the motion vector that has been generated by the motion estimator, in a case where a predetermined block has been selected by the first means for selecting the one first block size;
means for generating second prediction signals by applying filter processing to the input signals;
means for calculating third evaluation values based upon second difference information indicative of differences between the second prediction signals and the moving-picture signal that is input to the apparatus for performing compression encoding;
means for preliminarily selecting a plurality of second block sizes based upon the third evaluation values;
means for calculating fourth evaluation values based upon the second difference information of the second block sizes preliminarily selected; and
means for selecting one second block size from the preliminarily selected second block sizes based upon the fourth evaluation values;
wherein a number of block sizes preliminarily selected in case of a block differs from a number of block sizes preliminarily selected in case of a subblock.

5. An apparatus for performing compression encoding of a moving-picture, comprising a motion estimator, a motion-compensated predicting unit and a frame memory, said motion-compensated predicting unit comprising:
a prediction signal generator comprising:
a plurality of input signal call units, each reading in a reconstructed signal of a block from said frame memory based upon a motion vector that has been generated by said motion estimator, and providing an input signal to an associated one of a plurality of filters;
wherein said plurality of filters generates prediction signals by applying filter processing to the input signals from corresponding ones of said input signal call units; and
a plurality of prediction signal memories storing and outputting respective ones of the plurality of prediction signals that have been generated by respective ones of said plurality of filters;
a block size decision unit comprising:
a first cost calculator calculating difference information indicative of differences between the prediction signals and an input moving-picture signal and outputting first evaluation values;
a preliminary selector selecting at least two block sizes from block sizes of small first evaluation values and outputting the at least two block sizes selected;
a second cost calculator calculating and outputting second evaluation values obtained by applying a frequency conversion to difference information corresponding to the at least two block sizes that have been output by said preliminary selector; and
a block size selector selecting a block size based upon the second evaluation values that have been output by said second cost calculator and outputting the selected block size and the evaluation value thereof as results of motion-compensated prediction; and
a prediction signal call circuit reading in a prediction signal from said prediction signal memory, which corresponds to the selected block size outputted from said block size decision unit, and outputting the prediction signal together with a second evaluation value and the block size outputted from said block size decision unit as results of motion-compensated prediction.

6. The apparatus according to claim 5, further comprising:
a first motion-compensated predictor receiving the moving-picture signal, the motion vector and the reconstructed signal from said frame memory as inputs;
a switch receiving an output signal from said first motion-compensated predictor and outputting the signal upon switching the signal to an output terminal or to an input of a second motion-compensated predictor; and
said second motion-compensated predictor receiving the moving-picture signal, the motion vector and the output of said switch as inputs;
wherein said first and second motion-compensated predictors comprise the motion-compensated predicting unit set forth in claim 5.

7. An apparatus for performing compression encoding of a moving-picture, comprising a motion estimator, a motion-compensated predicting unit and a frame memory, said motion-compensated predicting unit comprising:
- a prediction signal generator comprising:
  - a plurality of input signal call units, each reading in a reconstructed signal of a block from said frame memory based upon a motion vector that has been generated by said motion estimator, and providing an input signal to an associated one of a plurality of filters;
  - wherein said plurality of filters generates prediction signals by applying filter processing to the input signals from corresponding ones of said input signal call units; and
  - a plurality of prediction signal memories storing and outputting respective ones of the plurality of prediction signals that have been generated by respective ones of said plurality of filters;
- a block size decision unit comprising:
  - a first cost calculator calculating first evaluation values from difference information indicative of differences between an input moving-picture signal and the prediction signals output from said prediction signal generator, and outputting the first evaluation values;
  - a block size selector selecting a block size based upon the first evaluation values and outputting the block size and the difference information thereof; and
  - a second cost calculator applying a frequency conversion to the difference information of the outputted block size, calculating a second evaluation value and outputting the block size and the second evaluation value as results of motion-compensated prediction; and
- a prediction signal call circuit reading in a prediction signal from said prediction signal memory, which corresponds to the block size outputted from said block size decision unit, and outputting the prediction signal together with the second evaluation value and the block size outputted from said block size decision unit as results of motion-compensated prediction.

8. An apparatus for performing compression encoding of a moving-picture, comprising a motion estimator, a motion-compensated predicting unit and a frame memory, said motion-compensated predicting unit comprising:
- a prediction signal generator comprising:
  - a plurality of input signal call units, each reading in a reconstructed signal of a block from said frame memory based upon a motion vector that has been generated by said motion estimator, and providing an input signal to an associated one of a plurality of filters;
  - wherein said plurality of filters generates prediction signals by applying filter processing to the input signals from corresponding ones of said input signal call units; and
  - a plurality of prediction signal memories storing and outputting respective ones of the plurality of prediction signals that have been generated by respective ones of said plurality of filters;
- a block size decision unit comprising:
  - a difference calculator calculating and outputting difference information between an input moving-picture signal and prediction signals from said prediction signal generator;
  - a first cost calculator applying a frequency conversion to difference information of block sizes, calculating evaluation values and outputting the evaluation values; and
  - a block size selector selecting a block size based upon the evaluation values that have been output from said first cost calculator and outputting the selected block size and the evaluation value thereof as results of motion-compensated prediction; and
- a prediction signal call circuit reading in a prediction signal from said prediction signal memory, which corresponds to the selected block size outputted from said block size decision unit, and outputting the prediction signal together with the second evaluation value and the selected block size as results of motion-compensated prediction.

9. A method for performing compression encoding of a moving-picture, said method comprising:
- providing input signals to a motion-compensated predicting unit based upon a motion vector generated by a motion estimator;
- generating prediction signals by applying filter processing to the input signals;
- calculating first evaluation values based upon difference information indicative of differences between the prediction signals and a moving-picture signal that is input to a moving-picture compression encoding apparatus;
- preliminarily selecting a plurality of block sizes based upon the first evaluation values;
- calculating second evaluation values based upon difference information of the block sizes preliminarily selected; and
- selecting one block size from the plurality of preliminarily selected block sizes based upon the second evaluation values.

10. The method according to claim 9, wherein in case a subblock smaller than a block size exists in the motion-compensated predicting unit, the method further comprising selecting, by either a motion-compensated predicting unit of the block or a motion-compensated predicting unit of the subblock, the one block size.

11. A method for performing compression encoding of a moving-picture, said method comprising:
- providing input signals to a first motion-compensated predicting unit based upon a motion vector generated by a motion estimator, in a case where a subblock smaller than a block size exist in the motion-compensated predicting unit;
- generating first prediction signals by applying filter processing to the input signals;
- calculating first evaluation values based upon first difference information indicative of differences between the first prediction signals and a moving-picture signal that is input to a moving-picture compression encoding apparatus;
- preliminarily selecting a plurality of first block sizes based upon the first evaluation values;
- calculating second evaluation values based upon first difference information of the first block sizes preliminarily selected;
- selecting one first block size from the plurality of preliminarily selected first block sizes based upon the second evaluation values;
- providing input signals to a second motion-compensated predicting unit based upon the motion vector that has been generated by the motion estimator, in a case where a predetermined block has been selected by the block selection;
- generating second prediction signals by applying filter processing to the input signals;
- calculating third evaluation values based upon second difference information indicative of differences between the second prediction signals and the moving-picture signal that is input to the moving-picture compression encoding apparatus;

preliminarily selecting a plurality of second block sizes based upon the third evaluation values;

calculating fourth evaluation values based upon second difference information of the block sizes preliminarily selected; and selecting one second block size from the preliminarily selected block sizes based upon the fourth evaluation values.

12. A method for performing compression encoding of a moving-picture, said method comprising:

providing input signals to a first motion-compensated predicting unit based upon a motion vector generated by a motion estimator, in a case where a subblock smaller than a block size exists in the motion-compensated predicting unit;

generating first prediction signals by applying filter processing to the input signals;

calculating first evaluation values based upon first difference information indicative of differences between the first prediction signals and a moving-picture signal that is input to a moving-picture compression encoding apparatus;

preliminarily selecting a plurality of first block sizes based upon the first evaluation values;

calculating second evaluation values based upon first difference information of the first block sizes preliminarily selected;

selecting one first block size from the plurality of preliminarily selected block sizes based upon the second evaluation values;

providing input signals to a second motion-compensated predicting unit based upon the motion vector that has been generated by the motion estimator, in a case where a predetermined block has been selected by said step for selecting the block size;

generating second prediction signals by applying filter processing to the input signals;

calculating third evaluation values based upon second difference information indicative of differences between the second prediction signals and the moving-picture signal that is input to the moving-picture compression encoding apparatus;

preliminarily selecting a plurality of second block sizes based upon the third evaluation values;

calculating fourth evaluation values based upon second difference information of the block sizes preliminarily selected; and selecting one second block size from the preliminarily selected block sizes based upon the fourth evaluation values;

wherein a number of block sizes preliminarily selected in case of a block differs from a number of block sizes preliminarily selected in case of a subblock.

\* \* \* \* \*